Dec. 28, 1937.   J. DURHAM   2,103,451
FISH BOBBER
Filed Feb. 1, 1936

Inventor
James Durham
By Louis C. Vanderlip.
Attorney

Patented Dec. 28, 1937

2,103,451

UNITED STATES PATENT OFFICE 2,103,451

FISH BOBBER

James Durham, Warsaw, Ind.

Application February 1, 1936, Serial No. 61,923

1 Claim. (Cl. 43—49)

This invention relates to fishing tackle, and particularly to fish bobbers.

The principal object of my invention is to provide improved means for attaching a fishing line to a bob.

Another object is to provide improved means for readily attaching a fishing line to and detaching the line from a bobber, said means including a dual prong clamp.

A third object is to provide a one piece sheet metal clamp for attaching a fish line thereto, said clamp having a pair of opposed resilient clamping prongs.

Other and more specific objects of the invention are mentioned and described herein.

The invention is illustrated in the accompanying drawing, wherein

Similar numerals of reference indicate like parts throughout the several view on the drawing.

Figure 1:
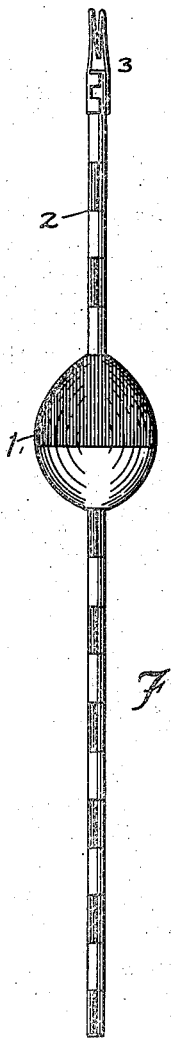
Figure 1 illustrates a bob with the invention applied thereto.
Figure 2:
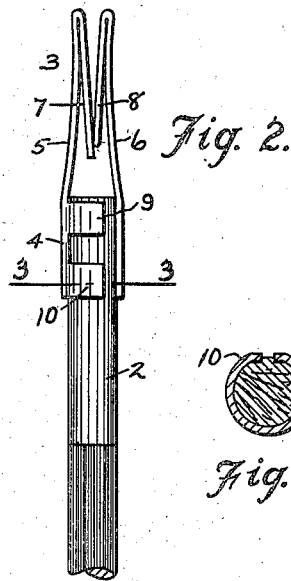
Figure 2 illustrates an enlarged fragmental view showing the invention applied to a bob stem.
Figure 3:
Figure 3 illustrates a section taken on line 3—3 of Figure 2.
Figure 4:
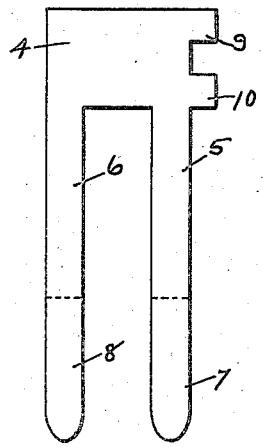
Figure 4 illustrates a view of the sheet metal blank from which the clamping element is formed.

Referring to the details of the drawing the numeral 1 indicates a common type of bob for fishing tackle and which is mounted on the bob stem 2. The numeral 3 indicates generally the double clamp which is adapted to receive and clamp the fishing line in either of its two jaws, as hereinafter described.

The clamp 3 which is a one piece element made of sheet metal includes the integral holder portion or sleeve 4, which encompasses and is rigidly connected with the end of the bob stem 2, and a pair of opposed clamping jaws which comprise the jaw shanks or arms of relative long length 5 and 6, respectively, integral with the holder portion 4, and the two resilient prongs 7 and 8, respectively, integral with said shank sections, said prongs having their free ends inturned toward the holder portion 4. The points of the prongs 7 and 8 may converge into yieldable contact with each other and prong 8 may be slightly shorter than prong 7 to facilitate detachment of the fish line from the clamp, as hereinafter described. Each of the two prongs 7 and 8 may contact with its shank section for a short distance from the outer end thereof to effect a wedge shaped space, whereby a secure grip on the fish line may be obtained when said line is projected between the contacting prong points and then drawn outward into such wedge shaped area and into the closed gripping end thereof.

Ready removal of the fish line from either clamping element may be effected as follows: The line is first detached from the grip of either clamp prong by drawing the line toward the end of the stem 2, then applying pressure on the point of the prong 7 to separate the two prongs.

The clamp holder section 4 is provided with a pair of spaced fastener prongs 9 and 10 which, when said holder section is rolled or pressed about the end of the stem 2, have their points pressed into the wood of said stem, thereby rigidly fastening the clamp to the stem. The part of the stem between the fastener prongs or fingers 9 and 10 serves to constitute a stop to prevent longitudinal movement of the element on the stem and maintain the element in fixed relation on the stem.

I claim:—

Means for attaching a fishing line to the stem of a bob comprising a one piece sheet metal element having a portion thereof of substantially cylindrical form and having stem gripping fingers in spaced relation on the length of the cylinder and arms extending outwardly from said portion, said arms having their free ends inturned towards the substantially cylindrical portion and converging into contact with each other whereby a line will be held between the arms, said fingers being adapted to be pressed into the material of the stem to cause a part of the stem between the fingers to constitute a stop to prevent longitudinal movement of the element on the stem and maintain the element in fixed relation on the stem.

JAMES DURHAM.